United States Patent
Fujino et al.

(10) Patent No.: US 6,719,300 B2
(45) Date of Patent: Apr. 13, 2004

(54) METAL GASKET

(75) Inventors: Michio Fujino, Kanagawa (JP); Katsunori Ueda, Aichi (JP); Toshihiko Kumasaka, Kanagawa (JP); Masaya Seki, Kanagawa (JP)

(73) Assignee: Nichias Corporation, Tokyo (JP)

( * ) Notice: Subject to any disclaimer, the term of this patent is extended or adjusted under 35 U.S.C. 154(b) by 0 days.

(21) Appl. No.: 09/771,786

(22) Filed: Jan. 29, 2001

(65) Prior Publication Data
US 2001/0024017 A1 Sep. 27, 2001

(30) Foreign Application Priority Data

Mar. 23, 2000 (JP) ..................... 2000-082120
Mar. 23, 2000 (JP) ..................... 2000-082121
Mar. 23, 2000 (JP) ..................... 2000-082122

(51) Int. Cl.$^7$ .............................. F02F 11/00
(52) U.S. Cl. ................. 277/591; 277/594; 277/596
(58) Field of Search ...................... 277/591–601

(56) References Cited

U.S. PATENT DOCUMENTS

| | | | | |
|---|---|---|---|---|
| 3,473,813 A | * | 10/1969 | Meyers et al. | 277/601 |
| 4,126,318 A | * | 11/1978 | Belter | 277/598 |
| 4,635,949 A | * | 1/1987 | Lucas et al. | 277/595 |
| 4,754,982 A | * | 7/1988 | Udagawa et al. | 277/596 |
| 5,279,265 A | * | 1/1994 | Matsuo et al. | 123/195 C |
| 5,544,901 A | * | 8/1996 | Kubouchi et al. | 277/591 |
| 5,727,791 A | * | 3/1998 | Weiss et al. | 277/592 |
| 5,879,012 A | * | 3/1999 | Udagawa | 277/595 |
| 5,895,056 A | * | 4/1999 | Habuta et al. | 277/598 |
| 6,050,236 A | * | 4/2000 | Sawaki et al. | 123/195 C |
| 6,056,296 A | * | 5/2000 | Ii | 277/595 |
| 6,186,513 B1 | * | 2/2001 | Udagawa | 277/593 |
| 6,527,277 B2 | * | 3/2003 | Hegmann | 277/596 |
| 6,536,775 B1 | * | 3/2003 | Inciong | 277/596 |

FOREIGN PATENT DOCUMENTS

| | | | |
|---|---|---|---|
| DE | 4109951 A1 | * 10/1992 | ....... F16J/15/12 |
| JP | 2000-73860 | * 3/2000 | |
| JP | 2001-90840 | * 4/2001 | |

* cited by examiner

Primary Examiner—Anthony Knight
Assistant Examiner—Michael J. Kyle
(74) Attorney, Agent, or Firm—Flynn, Thiel, Boutell & Tanis, P.C.

(57) ABSTRACT

A metal gasket for sealing a region whereat there exists three pairs of sets of opposing surfaces between a cylinder block, a chain case and a cylinder head of a chain driving engine. The metal gasket includes an elastic seal member provided on an inner rim of a chain opening formed in said metal gasket, and a storing structure for liquid gasket material used for sealing. The storing structure defined is an enlargement of the chain opening oriented to coincide with a juncture of the region whereat three pairs of opposing surface areas exist, the enlargement defining a cavity in which is housed liquid gasket material and a through hole is provided externally of the cavity.

4 Claims, 12 Drawing Sheets

FIG. 3(III)

FIG. 15(III)

METAL GASKET

BACKGROUND OF THE INVENTION

1. Field of the Invention

Present invention relates to improvements to a metal gasket used as a joint seal interfacing three separate components in the form of a cylinder block, a chain case and a cylinder head of an internal combustion engine.

2. Description of the Prior Art

Figure 19:
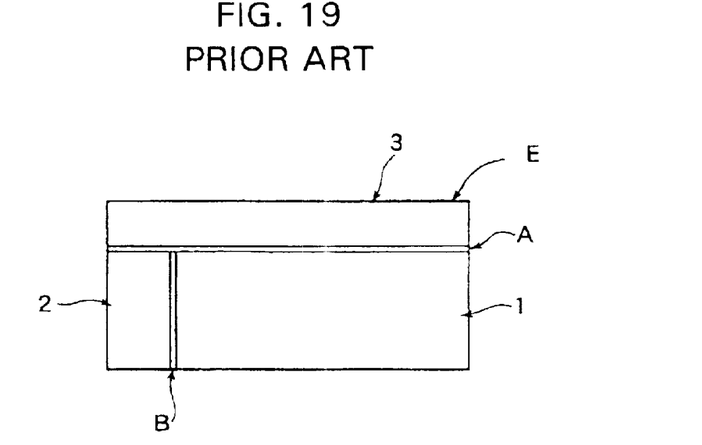
FIG. 19 is an outline constituting drawing of a prior art structure of a chain driving engine.
Figure 20:
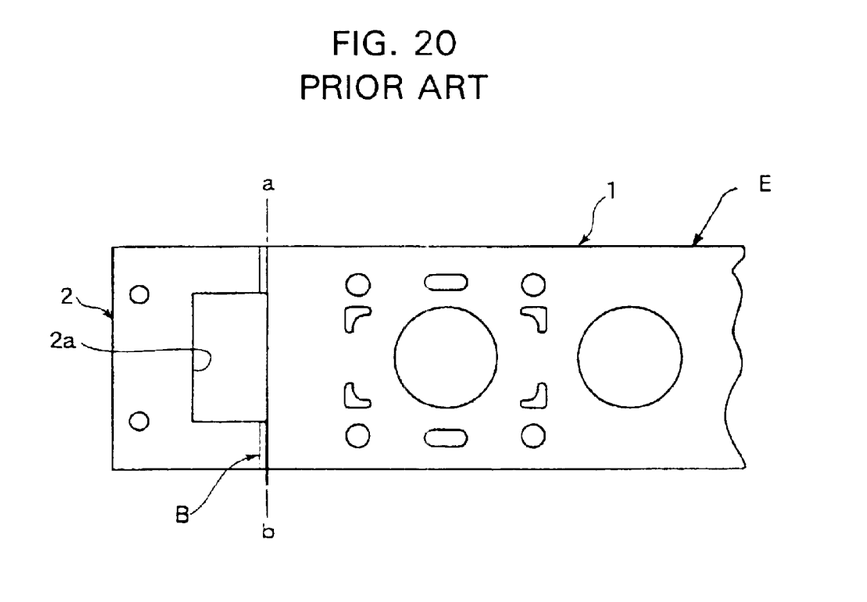
FIG. 20 is a plan view of the engine.

In a chain driving engine E, an independently manufactured chain case 2 is a neighboring component of and tightly connected to a cylinder block 1, as shown by FIGS. 19 and 20. There exists in this area three pairs of opposing surface areas, that is between the chain case and the cylinder block, and between an underside of cylinder head 3 and the chain case 2 whereat is provided a metal gasket A. It is this three opposing surface area region whereat a seal function is to be performed. B is a metal gasket provided between the cylinder block and the chain case. The A-B line shows a contacting boundary between the cylinder block 1 and the chain case 2.

Figure 21:
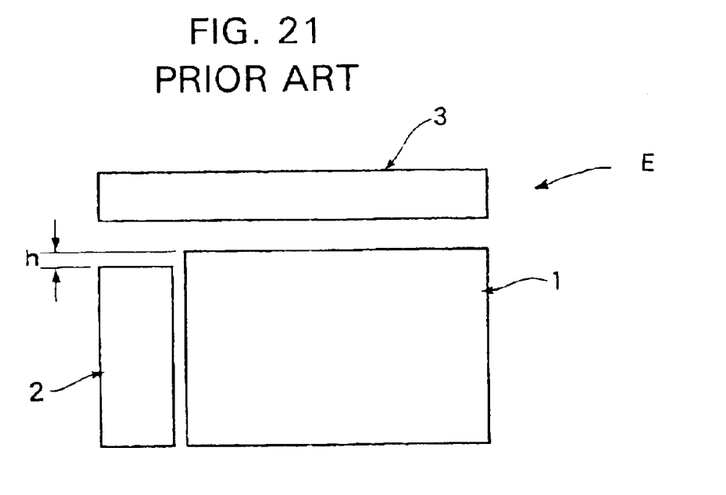
FIG. 21 is an exploded view of the above engine.
Figure 22:
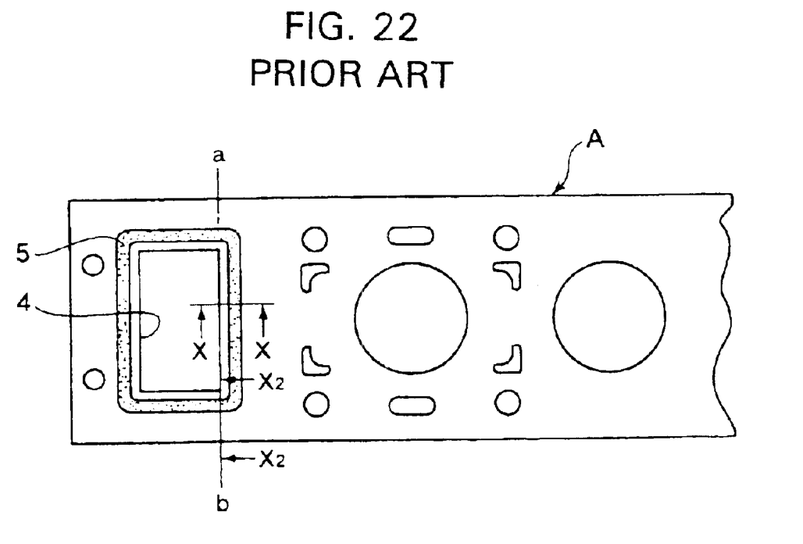
FIG. 22 is a plan view of a prior art structure of a metal gasket for the chain driving engine.

In the independently manufactured structures, namely, the chain case 2 and the cylinder block 1, a slight height differential h exists caused by thermal expansion differences between the cylinder block 1 and the chain case 2 as shown by FIG. 21.

Figure 23:
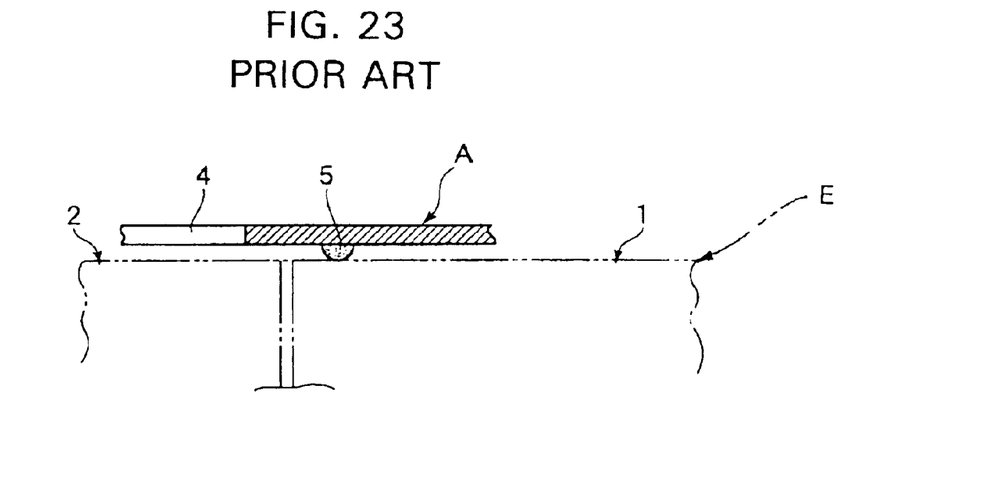
FIG. 23 is an enlarged cross-sectional view of a fragment of the metal gasket taken along a line X—X of FIG. 22.
Figure 24:
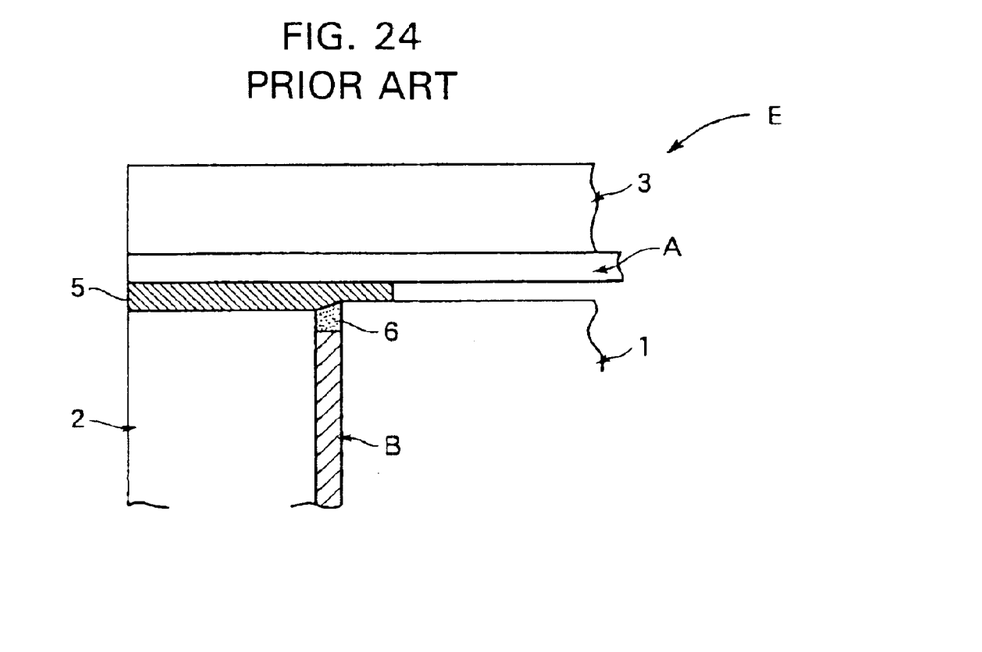
FIG. 24 is a side view showing a combination of a liquid gasket material with a metal gasket.

The occurrence of the above-mentioned height differential h leads to a diminished effectiveness of the seal function. On this account, an edge of an opening 4 for the chain in the metal gasket A is provided with an elastic seal member 5 (FIGS. 23 and 24) having a semicircular cross sectional view adjacent the mentioned height differential h. A paste or like liquid gasket material 6 is provided to ensure good sealing characteristics applied thereat.

However, when the fasteners securing the cylinder head and the chain case and/or cylinder block together are overtightened, then liquid gasket material is squeezed out of the joint due to overtightening pressure and the rubber-like elastomer is degradated. As a result, cracking occurs, or a sealing characteristic is diminished due to a decreasing of the rubber elasticity. Thus, engine oil leakage occurs where the cracking exists. The elasticity of the rubber, set before the metal gasket becomes further compressed when overtightening occurs, brings about a discrepancy because the elasticity of the rubber has been lost.

SUMMARY OF THE INVENTION

A metal gasket for sealing a region whereat there exists three sets of opposing pairs of surfaces between a cylinder block, a chain case and a cylinder head of a chain driving engine. The metal gasket includes an elastic seal member provided on an inner rim of a chain opening formed in said metal gasket, and a storing structure for liquid gasket material used for sealing. The storing structure is defined by an enlargement of the chain opening oriented to coincide with a juncture of the region whereat three pairs of opposing surface areas exist, the enlargement defining a cavity in which is housed liquid gasket material and a through hole is provided externally of the cavity.

BRIEF DESCRIPTION OF THE DRAWINGS

The objects and features of the present invention will become more apparent from the consideration of the following detailed description taken in conjunction with the accompanying drawings in which:

FIGS. 3(I) to 3(III) are each cross-sectional views showing an example of an elastic seal member joined to a metal gasket;

FIGS. 15(I) to 15(III) are each cross-sectional views showing an example of an elastic seal member joined to a metal gasket;

DESCRIPTION OF THE PREFERRED EMBODIMENTS

Referring next to the drawings, description will be given in detail of a metal gasket in accordance with the present invention.

In FIGS. 1 to 4, an embodiment of the present invention is shown. In FIGS. 13 to 18, same or similar member(s) of FIGS. 1 to 4 are suffixed to the same numerals.

Figure 1:
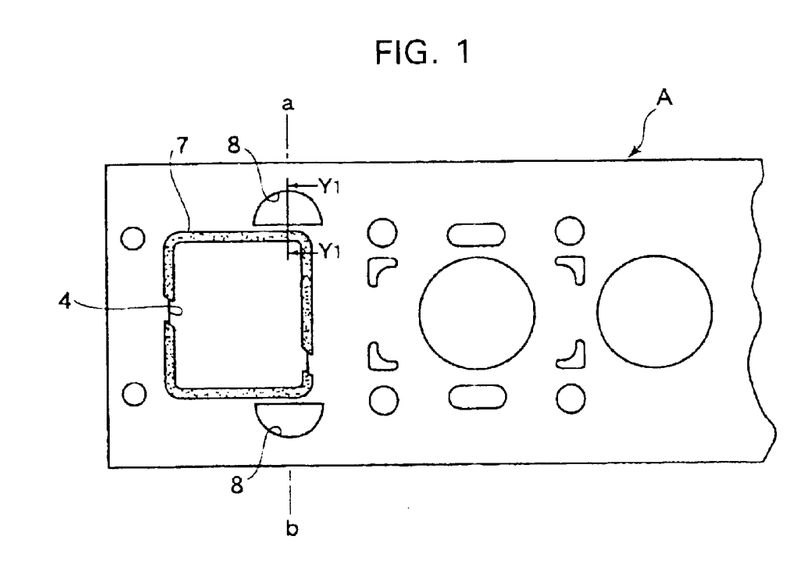
FIG. 1 is a plan view showing an embodiment of a main metal gasket of the present invention.

A is a metal gasket. An inner side edge of an opening 4 provided with the metal gasket A for a chain 3, a rubber elastic seal member 7 having a cross section. In the metal gasket A, a through opening portion 8 is set in a metal part thereof spaced from the elastic seal member 7 and an area whereat there exist 3 sets of opposing pairs of surfaces.

When a fastener securing the cylinder head and the chain case and/or cylinder block is overtightened, the through hole 8 is used to pour a liquid gasket material 6 thereinto. As a result, the liquid gasket material will be prevented from contacting and adhering to the rubber made elastic seal member 7 as the cylinder head 3 is positioned on the cylinder block 1 and chain case 2.

Figure 17:
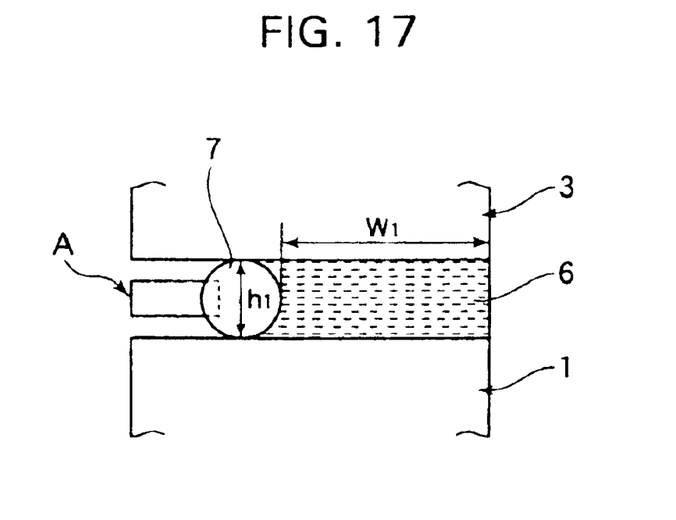
FIG. 17 is an enlarged cross-sectional view of a fragment of the metal gasket taken along a line $Y_2$—$Y_2$ of the metal gasket of FIG. 16.
Figure 18:
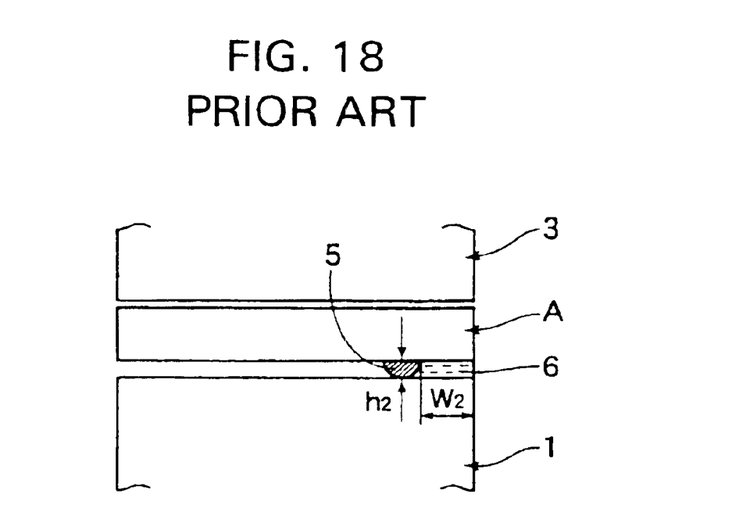
FIG. 18 is an enlarged cross-sectional view of a fragment of the metal gasket taken along a line $X_2$—$X_2$ of the metal gasket of FIG. 22.

By applying to the inner rim or edge of the opening 4 in the metal gasket A rubber elastic seal member 7 having a circular cross section, there is an advantage that the amount of liquid gasket material 6 can equal the depth of the seal member diameter as shown in FIG. 17.

Figure 2:
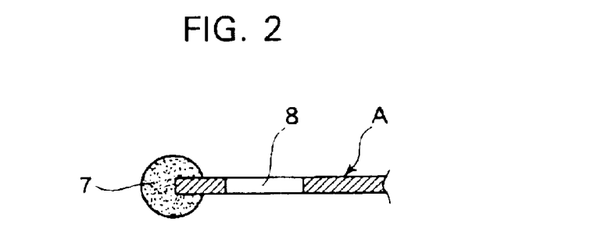
FIG. 2 is an enlarged cross-sectional view of a fragment of the metal gasket taken along a line $Y_1$—$Y_1$ of the metal gasket of FIG. 1.

The rubber elastic seal member 7 having a circular type cross-section is simple to interposing a metal gasket side shown by FIG. 2. It may apply to joinings with the metal gasket as shown by FIGS. 3(I) to 3(III).

Figure 3:
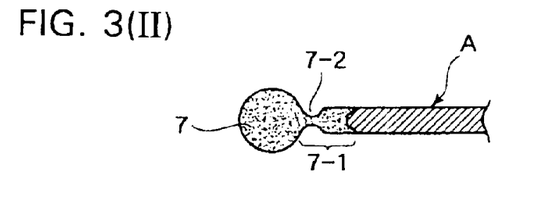
Figure 3I:
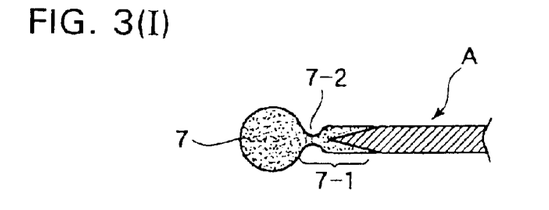
Figure 4:
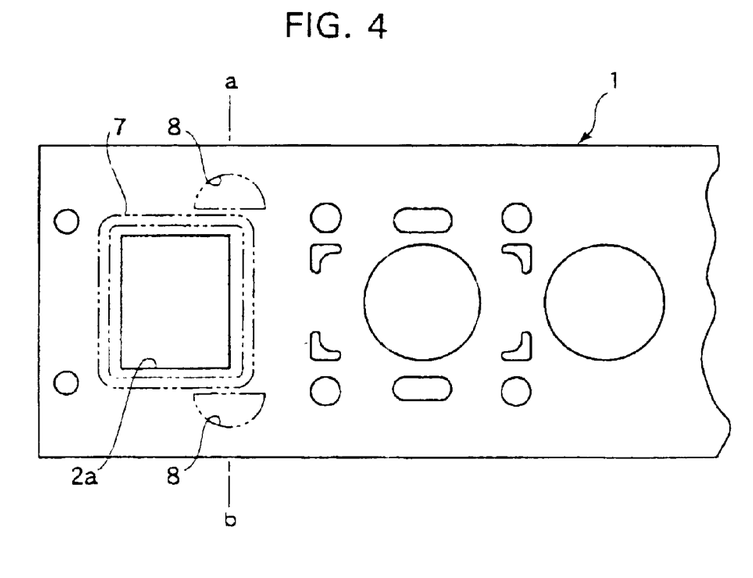
FIG. 4 is an explanation drawing showing a configuration of an elastic seal member for the chain case cover hole.

FIG. 3(I) illustrates a tapered part in the metal gasket and on which is provided an elastic seal member 7 to form a joint part 7-1. In the joint part 7-1, a section of reduced thickness 7-2 is provided.

FIG. 3(II) illustrates that the tapered part is trapezoidal in cross-section and FIG. 3(III) illustrates that the tapered part is a tapered concave form or another tapered form. By comparing the illustration of FIG. 2, constitutions with the illustrations of FIGS. 3(I) to 3(III) it will be apparent that the elastic seal member 7 can be compressed up to the plate thickness of the metal gasket.

The above elastic seal member is not limited to a circular type cross section. For example, it may apply to a rectangular shape. When the member 7 has the above-described seal function, then other cross-sectional forms may be optionally selected and made applicable.

Material of the elastic seal member is not to be limited to rubber material. When the material is to have a rubber elasticity, then other forms of elastic materials may be optionally selected and made applicable. The above metal gasket does not need to be a metal plate, but can., instead, be a laminated thin plate having thermo-resistivity.

The above metal gasket is no special limitation of the basic concept. For example, the metal gasket may be applicable to a concept that includes a superposed portion of the independently formed surface on the chain case, and the superposed portion is combined with a metal gasket superposed on the surface of the cylinder block.

Figure 5:
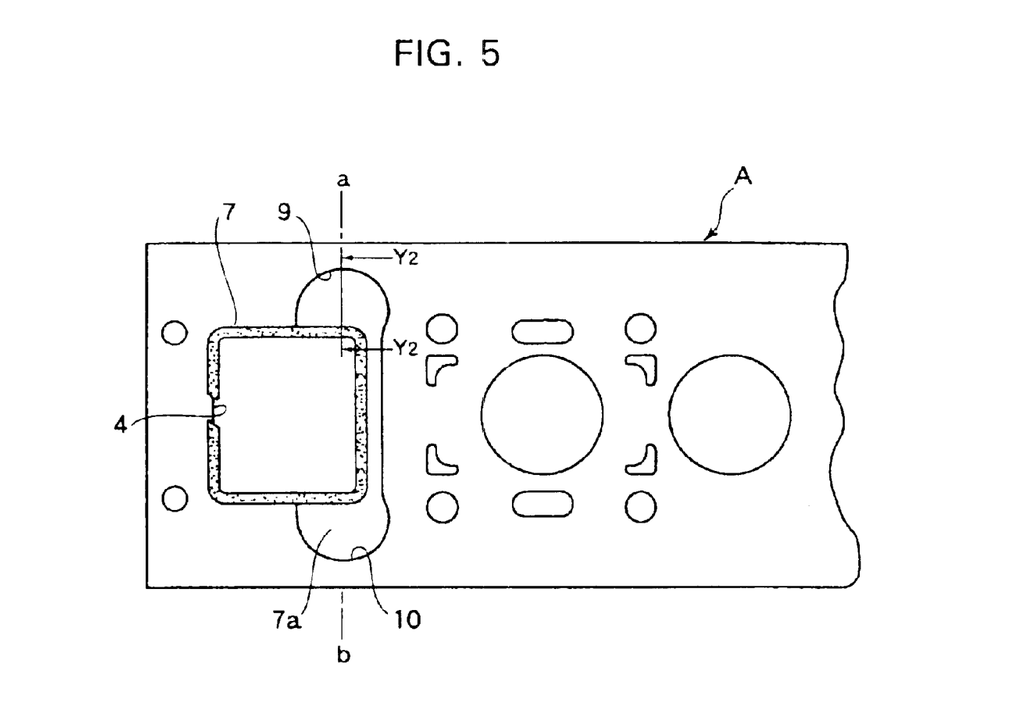
FIG. 5 is a plan view showing another embodiment of a main metal gasket.
Figure 6:
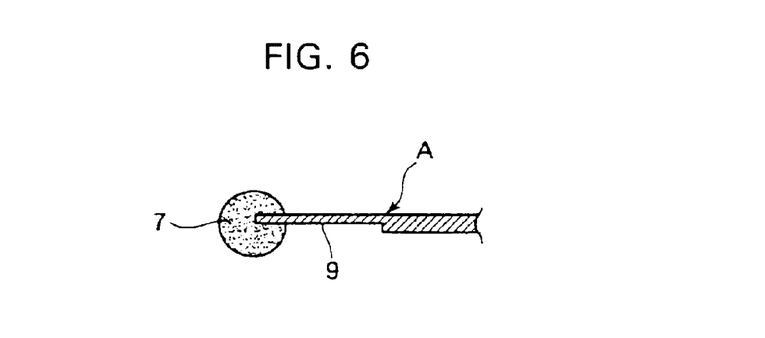
FIG. 6 is an enlarged cross-sectional view of a fragment of the metal gasket taken along a line $Y_2$—$Y_2$ of the metal gasket of FIG. 5.

Another embodiment of a metal gasket is shown in FIGS. 5 and 6. This embodiment utilizes a section of reduced thickness 9 in place of the through hole 8 of the before mentioned embodiment. The region of reduced thickness above 9 is formed by cutting or pressing the metal plate to a predetermined depth.

Figure 7:
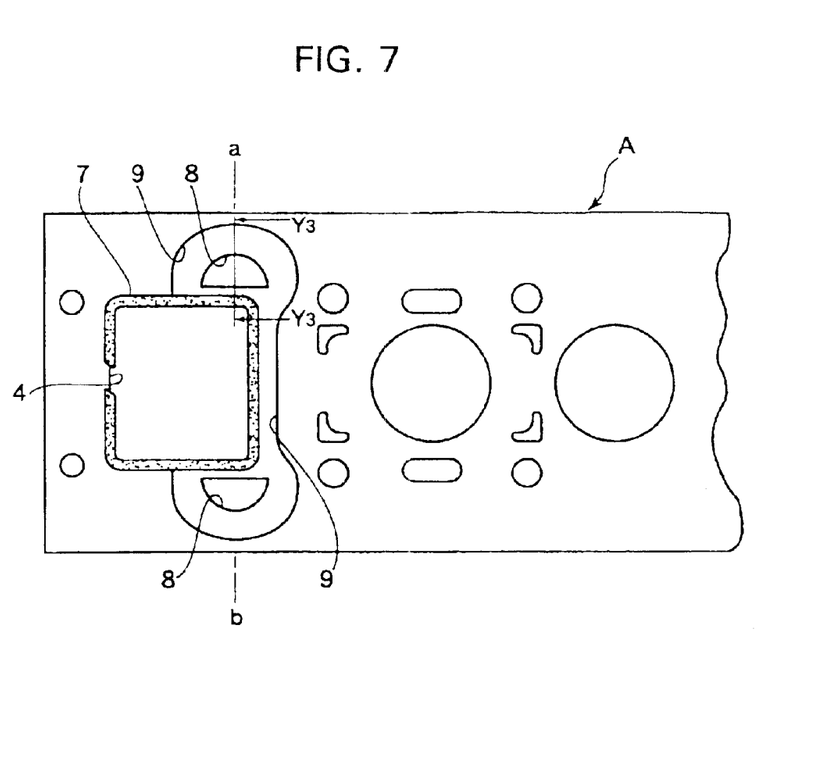
FIG. 7 is a plan view showing further another embodiment of a main metal gasket.
Figure 8:
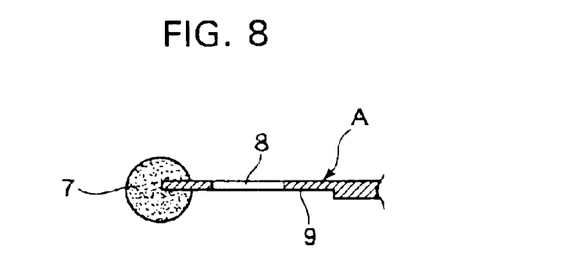
FIG. 8 is an enlarged cross-sectional view of a fragment of the metal gasket taken along a line $Y_3$—$Y_3$ of the metal gasket of FIG. 7.

Furthermore, another embodiment of a metal gasket is shown in FIGS. 7 and 8. This embodiment has both a region of reduced thickness 9 and a through hole 8.

Figure 9:
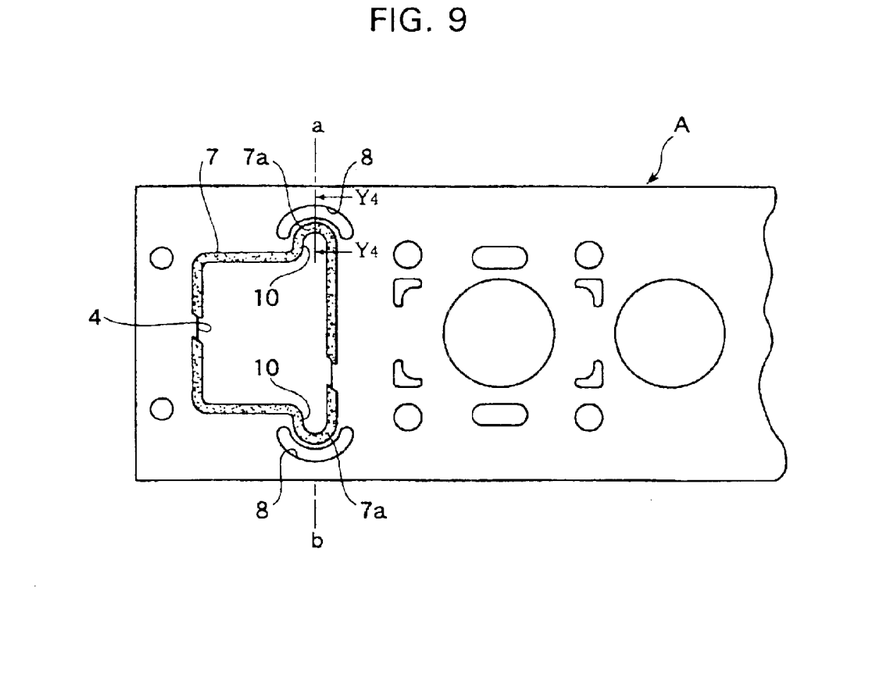
FIG. 9 is a plan view showing further another embodiment of a main metal gasket.
Figure 10:
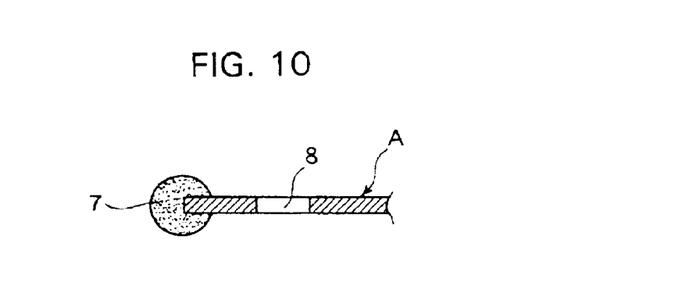
FIG. 10 is an enlarged cross-sectional view of a fragment of the metal gasket taken along a line $Y_4$—$Y_4$ of the metal gasket of FIG. 9.

Furthermore, another embodiment of a metal gasket is shown in FIGS. 9 and 10. This embodiment includes an enlargement 7a of the previously described opening 4, which enlargement coincides with the juncture of the area whereat three pairs of opposing surface areas exist. The enlargement 7a defines a cavity 10 in which is housed liquid gasket material . A through hole 8 is provided externally of the cavity 10.

When a fastener securing the cylinder head and the chain case and/or cylinder block is overtightened, liquid gasket material is squeezed out of the joint into the cavity 10 and the through hole 8.

Figure 11:
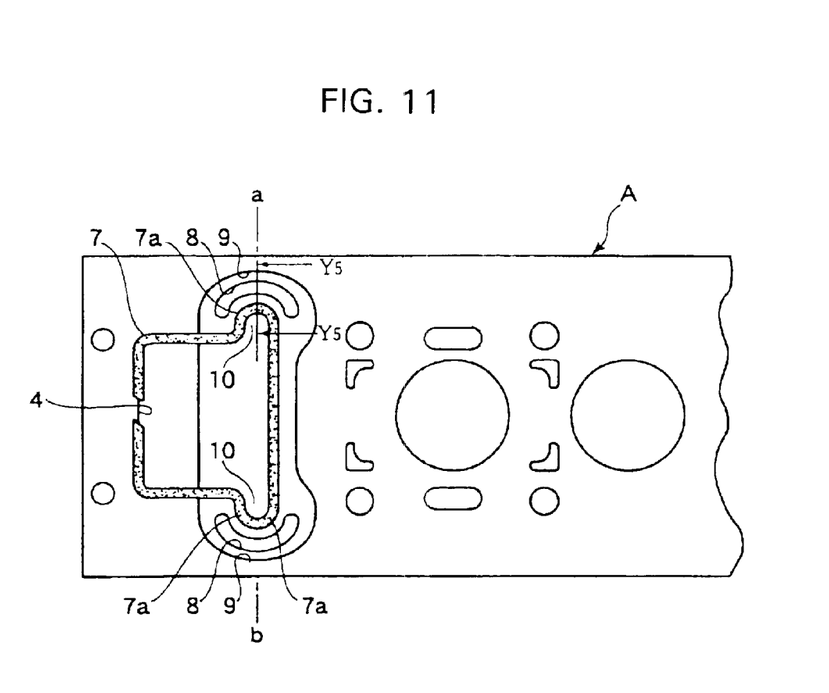
FIG. 11 is a plan view showing further another embodiment of a main metal gasket.
Figure 12:
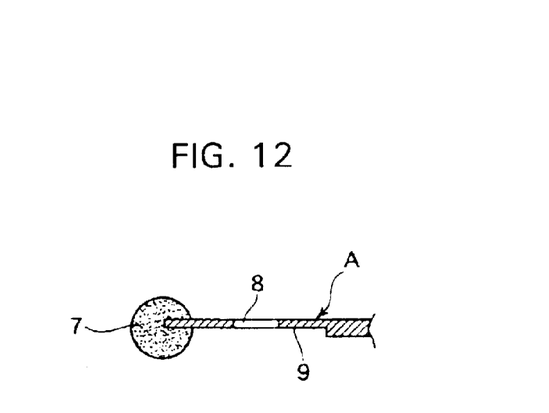
FIG. 12 is an enlarged cross-sectional view of a fragment of the metal gasket taken along a line $Y_5$—$Y_5$ of the metal gasket of FIG. 11.
Figure 13:
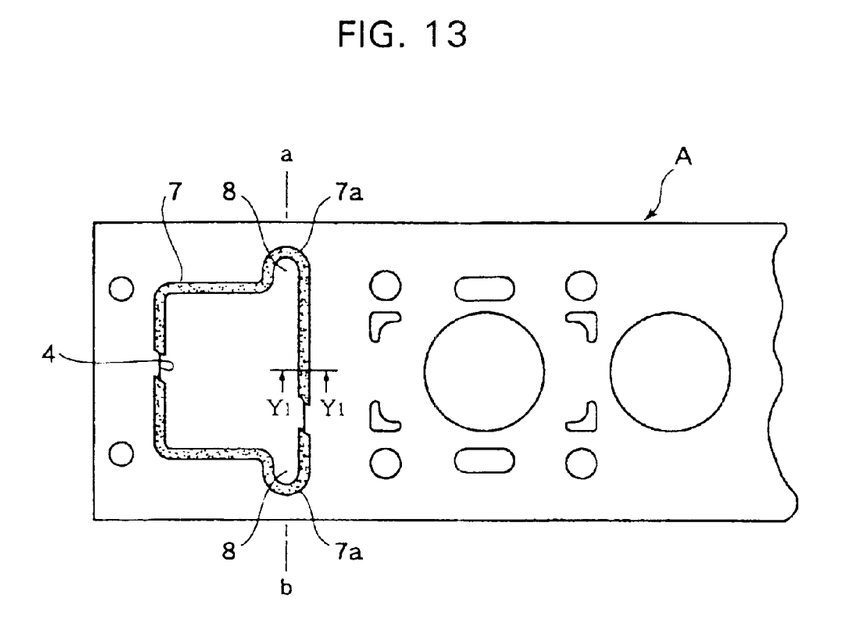
FIG. 13 is a plan view showing further another embodiment of a main metal gasket.

FIGS. 11 and 12 show another embodiment of the present invention. This embodiment includes a combination of the through hole 8 of the embodiment according to FIGS. 9 and 10 and the region of reduced thickness 9 of the embodiment according to FIGS. 5 and 6.

According to each of the above-mentioned embodiments, it is preferred that a protecting pellicle is formed to provide an elastic seal member and furthermore, not only the elastic seal member but a metal plate may be coated.

Figure 14:
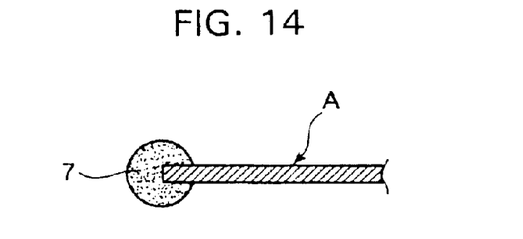
FIG. 14 is an enlarged cross-sectional view of a fragment of the metal gasket taken along a line $Y_6$—$Y_6$ of the metal gasket of FIG. 13.
Figure 15:
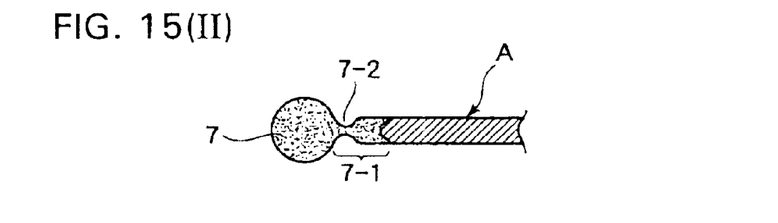
Figure 15I:
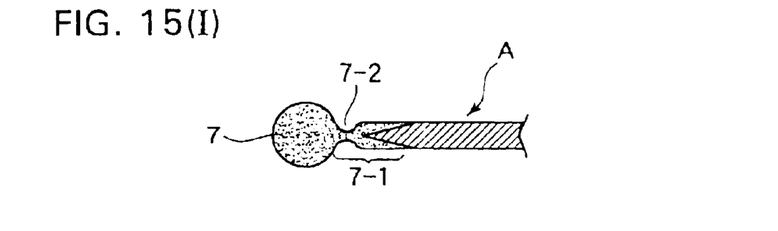
Figure 16:
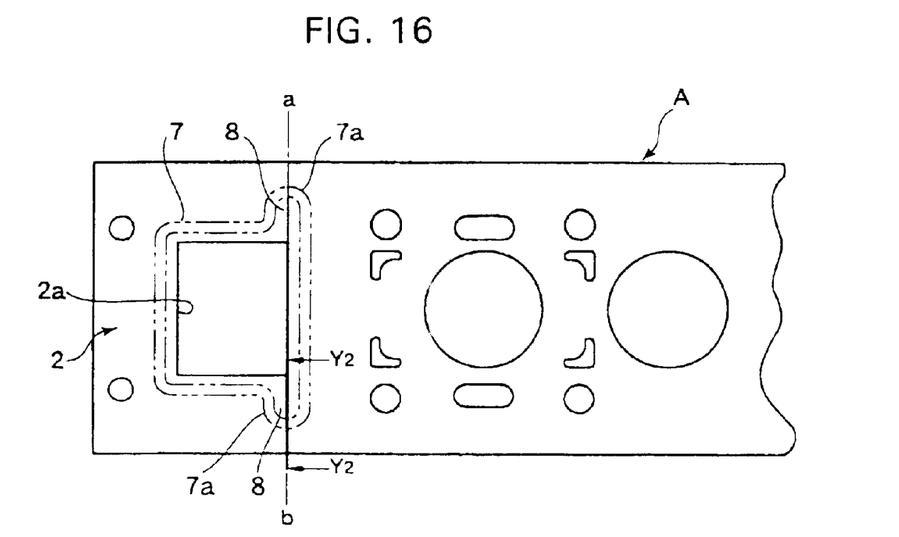
FIG. 16 is an explanation drawing showing a configuration of an elastic seal member for the chain case cover hole.

FIGS. 13 to 16 show another embodiment of the present invention. A rubber elastic seal member 7 is provided on the inner rim of an opening 4 for a chain provided in the metal gasket A. FIG. 14 shows the elastic seal member 7 in section cut along a line $Y_1$—$Y_1$ of FIG. 13.

In accordance with the present invention, there is provided a metal gasket that is used as a connecting seal for a region whereat there exists three pairs of opposing surface areas between the cylinder block, chain case and cylinder head, said metal gasket having an elastic seal member provided on an inner rim of a chain opening, a storing means for liquid gasket material for sealing. Therefore, the metal gasket is provides not only a superior seal characteristic but is durable over a long period of time without deterioration of the seal characteristic.

The metal gasket consisting of a metal plate having a through hole oriented outside of the elastic seal member and/or a section of reduced thickness permits, in response to a tightening of the fasteners, the squeezed out liquid gasket matter.

What is claimed is:

1. A metal gasket disposed in a region whereat there exists three sets of opposing pairs of surfaces between a cylinder block, a chain case and a cylinder head of a chain driving engine to seal the region, said metal gasket comprising a through opening configured to receive a chain therethrough and having an elastic seal member provided on an inner rim perimeter of the chain receiving through opening, said metal gasket additionally having a storing means configured to receive therein a liquid gasket material disposed in said region and being used for sealing said region together with said metal gasket; and wherein said storing means is defined by an enlargement of the chain receiving through opening configured to coincide with a juncture of the region whereat three pairs of opposing surface areas exist, the enlargement being located within the perimeter of the elastic seal member and defining a cavity, said metal gasket additionally having a through hole provided externally of the elastic seal member and adjacent to said enlargement, said cavity and said through hole being configured to house a part of the liquid gasket material squeezed thereinto in response to an overtightening of a connection between the cylinder head and the chain case and/or the cylinder block to thereby protect contact of the liquid gasket material with the elastic seal member.

2. The metal gasket according to claim 1, wherein said metal gasket has a region of reduced thickness.

3. The metal gasket according to claim 2, wherein said through hole is oriented in said region of reduced thickness.

4. The metal gasket according to claim 1, wherein said elastic seal member is a protecting pellicle.

* * * * *